(12) United States Patent
Hatfield et al.

(10) Patent No.: US 12,474,987 B2
(45) Date of Patent: Nov. 18, 2025

(54) APPLICATION RECOVERY ACCELERATOR

(71) Applicant: International Business Machines Corporation, Armonk, NY (US)

(72) Inventors: Brian D. Hatfield, Tucson, AZ (US); Travis Janssen, San Jose, CA (US); Runyu Jin, San Diego, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 18/509,603

(22) Filed: Nov. 15, 2023

(65) Prior Publication Data
US 2025/0156255 A1 May 15, 2025

(51) Int. Cl.
*G06F 11/00* (2006.01)
*G06F 11/07* (2006.01)
*G06F 11/14* (2006.01)

(52) U.S. Cl.
CPC ........ *G06F 11/073* (2013.01); *G06F 11/1469* (2013.01)

(58) Field of Classification Search
CPC ........................... G06F 11/073; G06F 11/1469
See application file for complete search history.

(56) References Cited

U.S. PATENT DOCUMENTS

| | | | | |
|---|---|---|---|---|
| 6,078,520 A | * | 6/2000 | Tobita | G11C 29/765 365/185.11 |
| 6,959,331 B1 | * | 10/2005 | Traversat | G06F 11/202 713/1 |
| 7,992,031 B2 | | 8/2011 | Chavda et al. | |
| 10,831,545 B2 | | 11/2020 | Rao Kotha et al. | |
| 10,977,132 B2 | | 4/2021 | Deshpande et al. | |
| 11,237,915 B2 | | 2/2022 | Mehta et al. | |
| 11,663,091 B2 | | 5/2023 | Shin et al. | |
| 2016/0248440 A1 | * | 8/2016 | Greenfield | H03M 7/30 |
| 2016/0335162 A1 | | 11/2016 | Jin et al. | |
| 2024/0061751 A1 | * | 2/2024 | Janarthanam | G06F 11/2097 |

OTHER PUBLICATIONS

Sherry et al., Rollback-Recovery for Middleboxes, SIGCOMM '15, pp. 227-240, Aug. 17-21, 2015.

* cited by examiner

*Primary Examiner* — Joshua P Lottich
(74) *Attorney, Agent, or Firm* — Garg Law Firm, PLLC; Rakesh Garg; Michael O'Keefe

(57) ABSTRACT

An embodiment includes detecting, by a Recovery System, a cache metric where the cache metric comprises a probability of access to a data object for each of a plurality of time segments of a failover log, where the probability of access to the data object for each of the plurality of time segments is based on an access time of the data object contained in the failover log. The embodiment also includes responsive to receiving the cache metric, caching by the Recovery System of the data object based on the cache metric where the data object is cached in a standby cache of the Recovery System.

20 Claims, 7 Drawing Sheets

TABULAR FORM OF 4 FAILOVER RUNS FOR 4 FILES

610

| FILE ID | ACCESS TIME(S): RUN 1 | ACCESS TIME(S): RUN 2 | ACCESS TIME(S): RUN 3 | ACCESS TIME(S): RUN 4 |
|---|---|---|---|---|
| A | 10 | 10 | 7 | 15 |
| B | 12 | 20 | 15 | 24 |
| C | NOT ACCESSED | NOT ACCESSED | 25 | NOT ACCESSED |
| D | 2 | 4 | NOT ACCESSED | NOT ACCESSED |

PROBABILITY OF ACCESS PER FILE ACROSS SEVERAL TIME SEGMENTS

620

| FILE ID | SEGMENT 1: 0-5S | SEGMENT 2: 6-20S | SEGMENT 3: 21S+ | NOT ACCESSED |
|---|---|---|---|---|
| A | 0.25 | 0.75 | 0 | 0 |
| B | 0 | 0.5 | 0.5 | 0 |
| C | 0 | 0 | 0.25 | 0.75 |
| D | 0.5 | 0 | 0 | 0.5 |

PLACEMENT DECISIONS FOR EXAMPLE FILES, BASED ON ALL DATA ABOVE, GIVEN THRESHOLD OF 50%

630

| SEGMENT | FILE IDS | JUSTIFICATION |
|---|---|---|
| 1: 0-5S | D | D: TIED BETWEEN SEGMENT 1 AND "NOT ACCESSED"; CHOOSE LOWEST (SEGMENT 1). |
| 2 6-20S | A, B | A: HIGHEST PROBABILITY PLACEMENT. B: TIED BETWEEN SEGMENT 2 AND 3; CHOOSE LOWEST. |
| 3: 21S+ | - | NONE OF THE GIVEN FILE IDS WILL BE CACHED FOR THIS SEGMENT. |

APPLICATION RECOVERY ACCELERATOR

BACKGROUND

The present invention relates generally to disaster recovery. More particularly, the present invention relates to a method, system, and computer program for An Application Recovery Accelerator.

Disaster recovery (DR) consists of IT technologies and best practices designed to prevent or minimize data loss and business disruption resulting from catastrophic events—everything from equipment failures to localized power outages, civil emergencies, criminal or military attacks, and natural disasters. Infrastructure failure can cost as much as USD 100,000 per hour and critical application failure costs can range from USD 500,000 to USD 1 million per hour. Many businesses cannot recover from such losses.

SUMMARY

The illustrative embodiments provide for an Application Recovery Accelerator. An embodiment includes detecting, by a Recovery System, a cache metric wherein the cache metric comprises a probability of access to a data object for each of a plurality of time segments of a failover log, wherein the probability of access to the data object for each of the plurality of time segments is based on an access time of the data object contained in the failover log. The embodiment also includes responsive to receiving the cache metric, caching by the Recovery System of the data object based on the cache metric wherein the data object is cached in a standby cache of the Recovery System.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts a diagram in accordance with an illustrative embodiment; and

DETAILED DESCRIPTION

Figure 1:
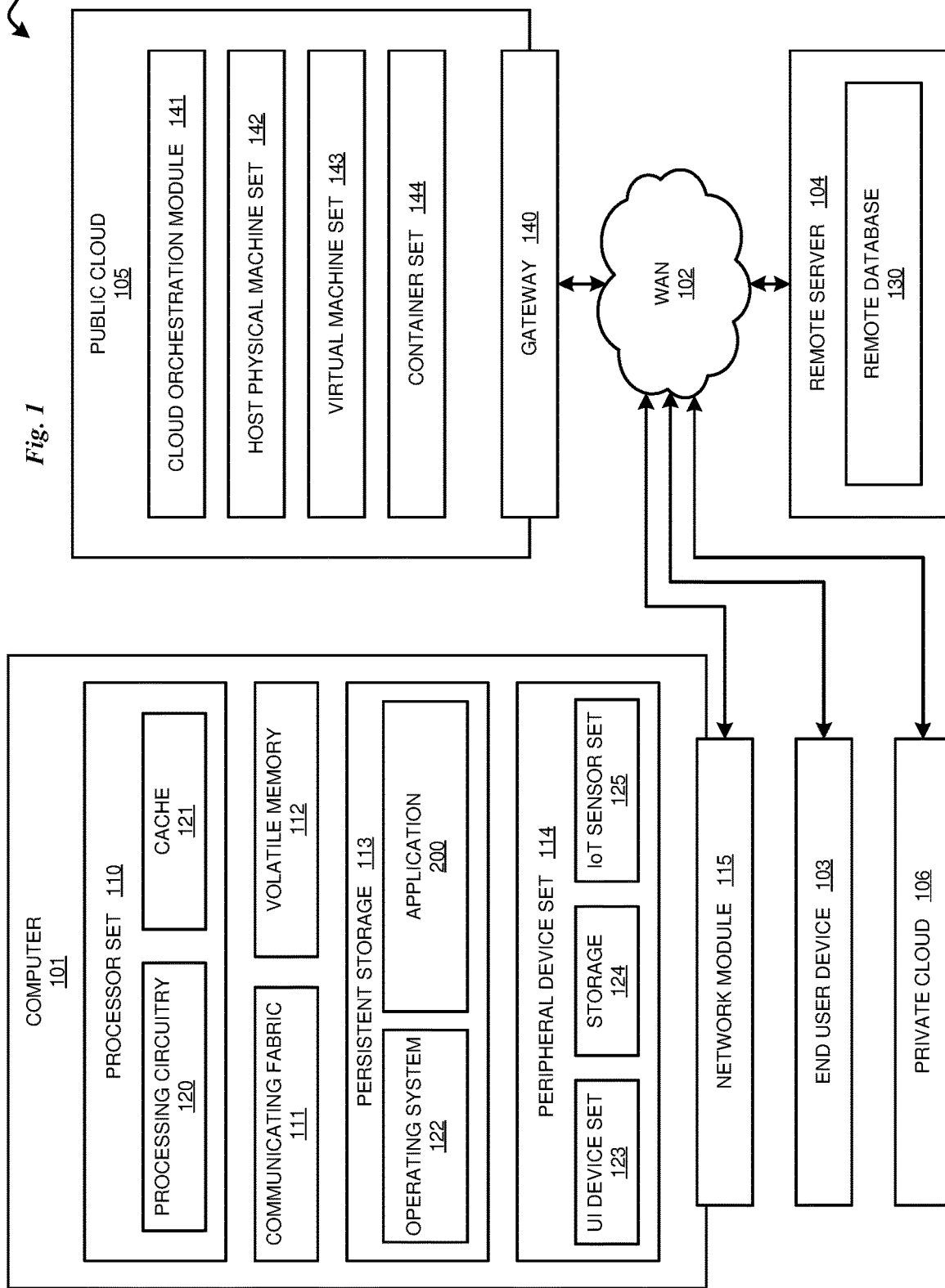
FIG. 1 depicts a block diagram of a computing environment in accordance with an illustrative embodiment.

Disaster recovery (DR) consists of IT technologies and best practices designed to prevent or minimize data loss and business disruption resulting from catastrophic events—everything from equipment failures to localized power outages, civil emergencies, criminal or military attacks, and natural disasters. Infrastructure failure can cost as much as USD 100,000 per hour and critical application failure costs can range from USD 500,000 to USD 1 million per hour. Many businesses cannot recover from such losses.

The present disclosure addresses the deficiencies described above by providing a method, a machine-readable medium, and a system for An Application Recovery Accelerator. An embodiment includes detecting, by a Recovery System, a cache metric wherein the cache metric comprises a probability of access to a data object for each of a plurality of time segments of a failover log, wherein the probability of access to the data object for each of the plurality of time segments is based on an access time of the data object contained in the failover log. The embodiment also includes responsive to receiving the cache metric, caching by the Recovery System of the data object based on the cache metric wherein the data object is cached in a standby cache of the Recovery System.

Illustrative embodiments include wherein the caching by the Recovery System comprises receiving the data object from a backup storage.

Illustrative embodiments include wherein the cache metric further comprises assigning the data object to a time segment in the plurality of time segments based on a threshold probability value and a highest cumulative probability value.

Illustrative embodiments include wherein each of the plurality of time segments is non-uniform and wherein a duration of each of the plurality of time segments is constant across a plurality of failover runs.

Illustrative embodiments include wherein computing the probability of access to the data object for each of the plurality of time segments comprises computing a cumulative probability of the access to the data object in a time segment and a previous time segment.

Illustrative embodiments include wherein the caching by the Recovery System of the data object comprises caching the data object assigned to a time segment in chronological order.

Illustrative embodiments also include wherein the standby cache of the Recovery System comprises a virtual machine.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides An Application Recovery Accelerator. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

The process software Application Recovery Accelerator is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 2:
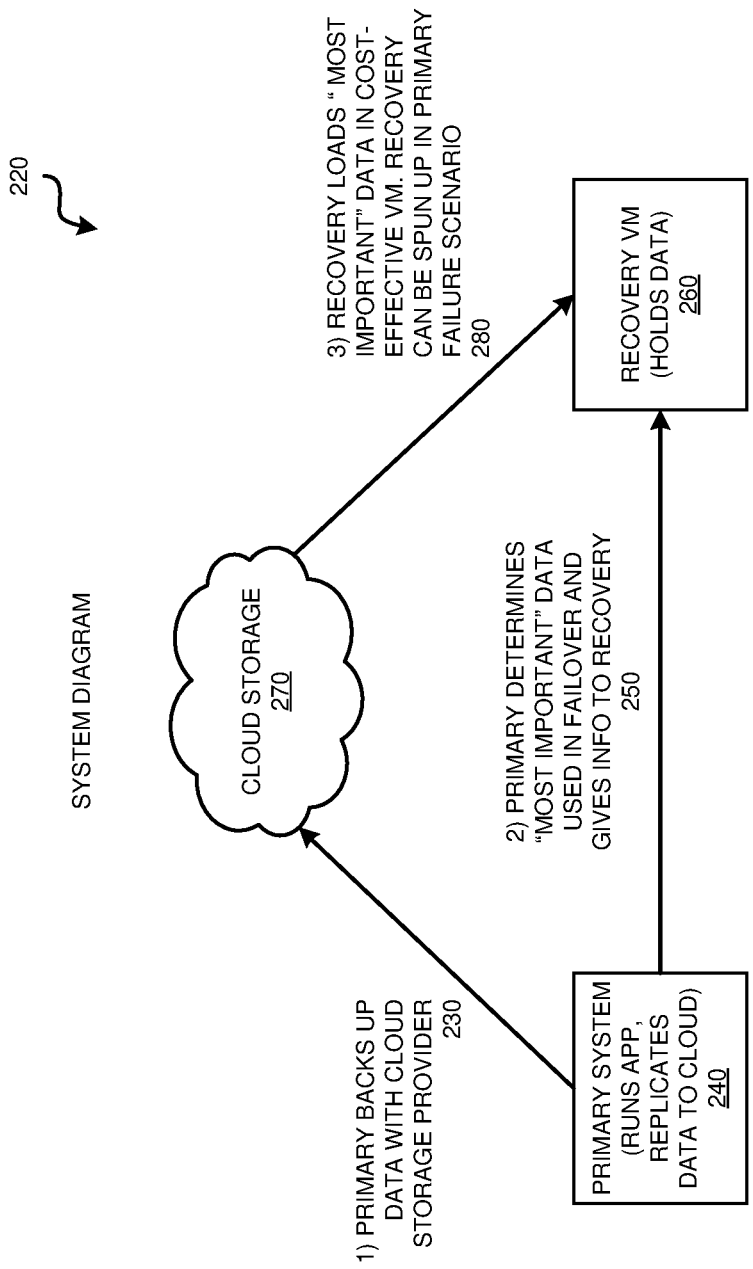
FIG. 2 depicts a system diagram in accordance with an illustrative embodiment.

FIG. 2 depicts a system diagram 220 in accordance with an illustrative embodiment. In a particular embodiment, the components 220 are representative of aspects of the application 200 of FIG. 1.

In the illustrated embodiment, the Primary System 240 runs applications and replicates or backs up data 230 to a cloud storage provider 270. The Primary System determines "most important" data or priority data and sends the data to the Recovery System 250. In certain embodiments, the priority data is determined for example by the number of times a data object is accessed or the time the data object is accessed by the Primary System or from the backup during a failover event. For example, data object access may comprise reading from and writing to the data object. The Recovery System 260 loads and caches the priority data from the cloud storage provider 270 for example into a virtual machine (VM) standby cache 280. In certain embodiments, the standby cache is a high-availability setup, in case of a failover or switchover scenario.

Figure 3:
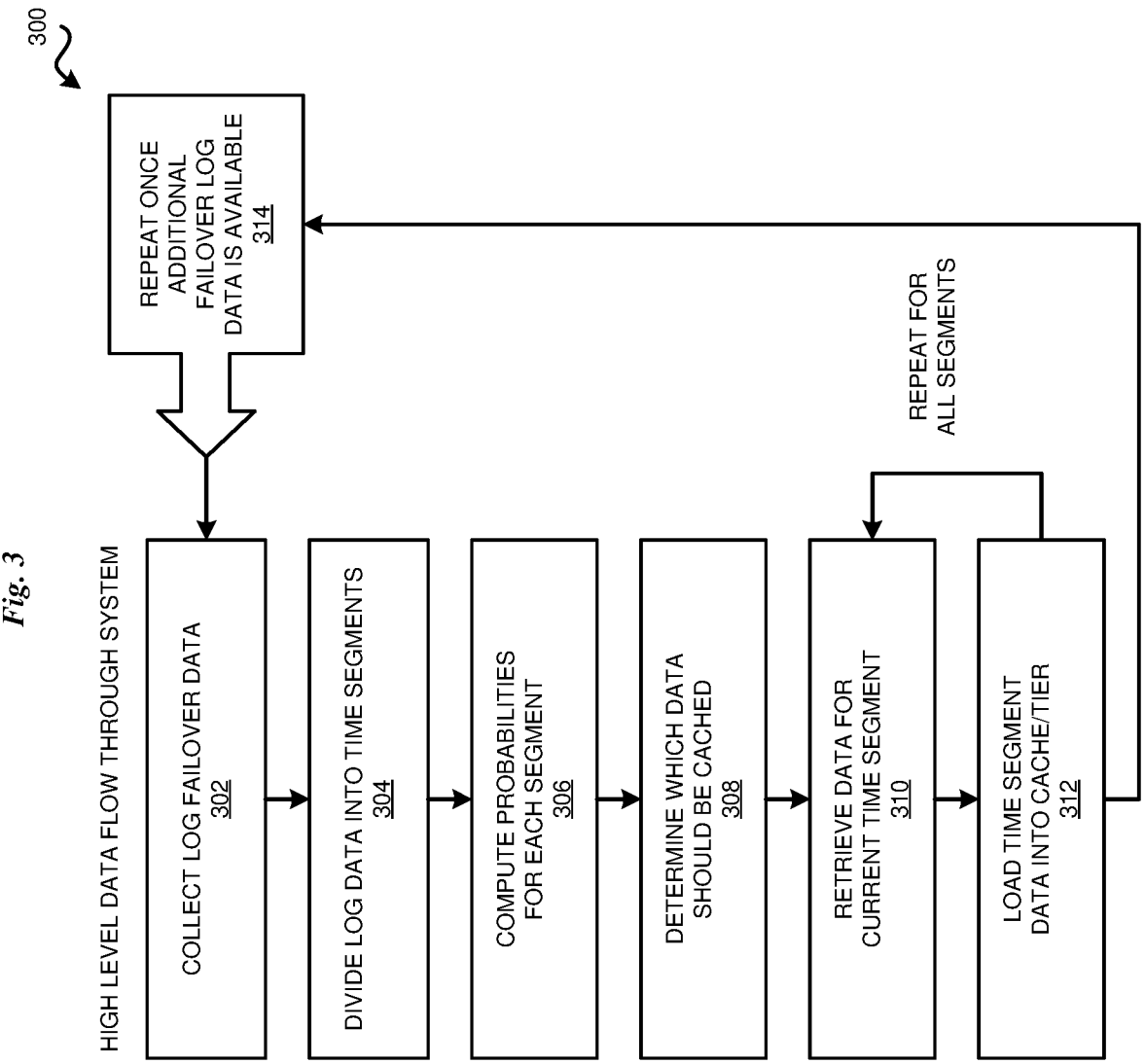
FIG. 3 depicts a flowchart diagram in accordance with an illustrative embodiment.

FIG. 3 depicts a flowchart diagram 300 in accordance with an illustrative embodiment. In a particular embodiment, the components of the system 300 are representative of aspects of the application 200 of FIG. 1.

In the illustrated embodiment, failover log data is collected from a log 302, the failover log data is used to segment into a plurality of segments for example time segments 304. The probability of access of to the data object is computed 306 for each of the plurality of time segments wherein the probability is based on an access time of the data object. For example, computing the probability of access to the data object for each of the plurality of time segments comprises computing a cumulative probability of the access to the data object in a time segment and a previous segment. Next determine which data object should be cached in a particular time segment 308. In an embodiment, the determination may comprise computing a cache metric wherein the cache metric is computed based on the probability of access to the data object for each of the plurality of time segments. In an embodiment, the cache metric further comprises assigning the data object to a time segment in the plurality of segments based on a threshold probability value. Using the cache metric, the Recovery System retrieves the data objects for each time segment 310, and loads the data objects into the standby cache 312 in chronological order. Steps 310 and 312 are repeated for all segments. In some embodiments, the process is repeated at step 302 once additional failover log data is available 314.

Figure 4:
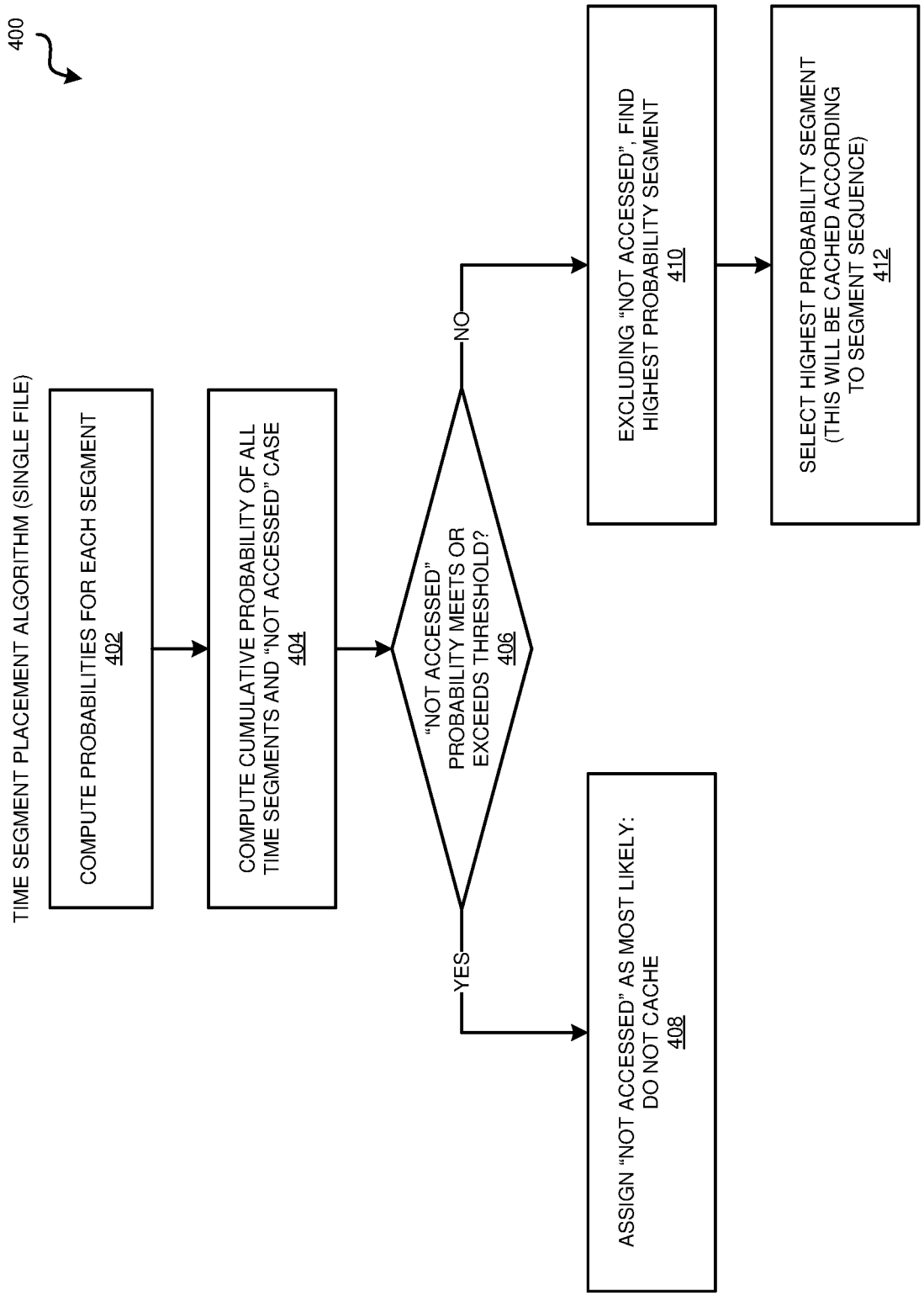
FIG. 4 depicts a flowchart diagram in accordance with an illustrative embodiment.

FIG. 4 depicts a flowchart diagram 400 in accordance with an illustrative embodiment. In a particular embodiment, the components 400 are representative of aspects of the application 200 of FIG. 1.

In the illustrated embodiment, the probabilities for each time segment are computed 402. The probability of each of the time segments for a data object is computed 404 including time segments when the data object is not accessed. In an embodiment, the probability is computed by computing the cumulative probability of the access to the data object in a time segment and a previous time segment. For the case of a not accessed segment, make a decision 406 if the cumulative probability of the data object for the segment exceeds a not accessed threshold value. For example, a not accessed threshold may comprise about 0 to 50%. If yes, assign not accessed as most likely and do not cache 408. If no, find the highest probability segment 410 and the data object in the segment will be cached according to segment sequence 412.

Figure 5:
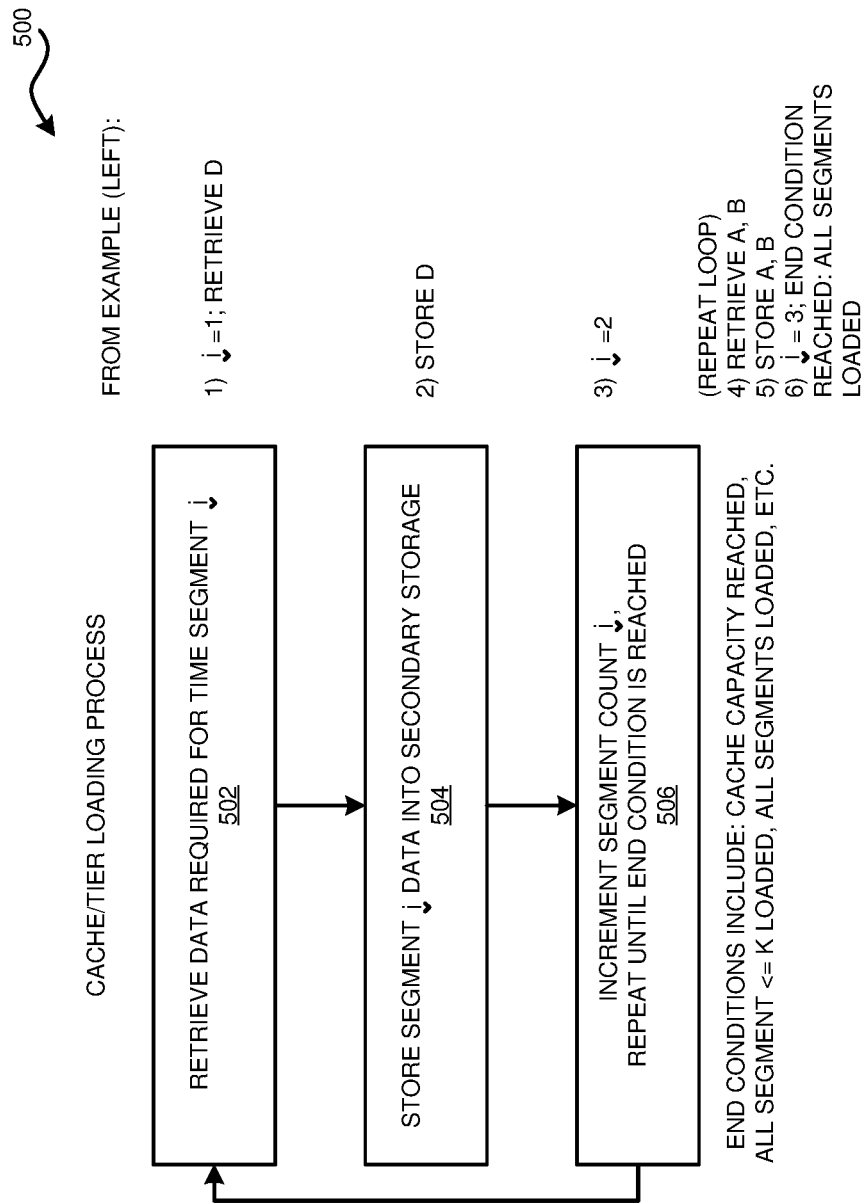
FIG. 5 depicts a flowchart diagram in accordance with an illustrative embodiment.

FIG. 5 depicts a flowchart diagram 500 in accordance with an illustrative embodiment. In a particular embodiment, the components 500 are representative of aspects of the application 200 of FIG. 1.

In the illustrated embodiment, in chronological order, retrieve the data object for the segment beginning at segment 1, 502. Cache the data object for time segment 1 in the standby cache of the Recovery System 504. Increment the time segment count until end condition is reached 506. For example, the end condition may be reached when the standby cache capacity is reached, the time segment sequence has reached a certain number or all the segments have been cached. The process is repeated.

FIG. 6 depicts a diagram 600 in accordance with an illustrative embodiment. In a particular embodiment, the components 600 are representative of aspects of the application 200 of FIG. 1.

In the illustrated embodiment, table 610 shows an exemplary failover log entries of access times for four files A, B, C, and D across 4 failover runs. Table 620 shows cumulative probabilities of access times for the 4 files across time segments. In an embodiment, the time segments are not uniform in duration but are constant across a plurality of failover runs. Table 630 shows the exemplary placement decisions for the 4 files, given a threshold of 50%. In certain embodiments such as in case of a tie as shown for files B and D, choose the lowest time segment that exceeds the threshold probability value. In other embodiments, the time segment when the data object is accessed with the highest cumulative probability is chosen.

Figure 7:
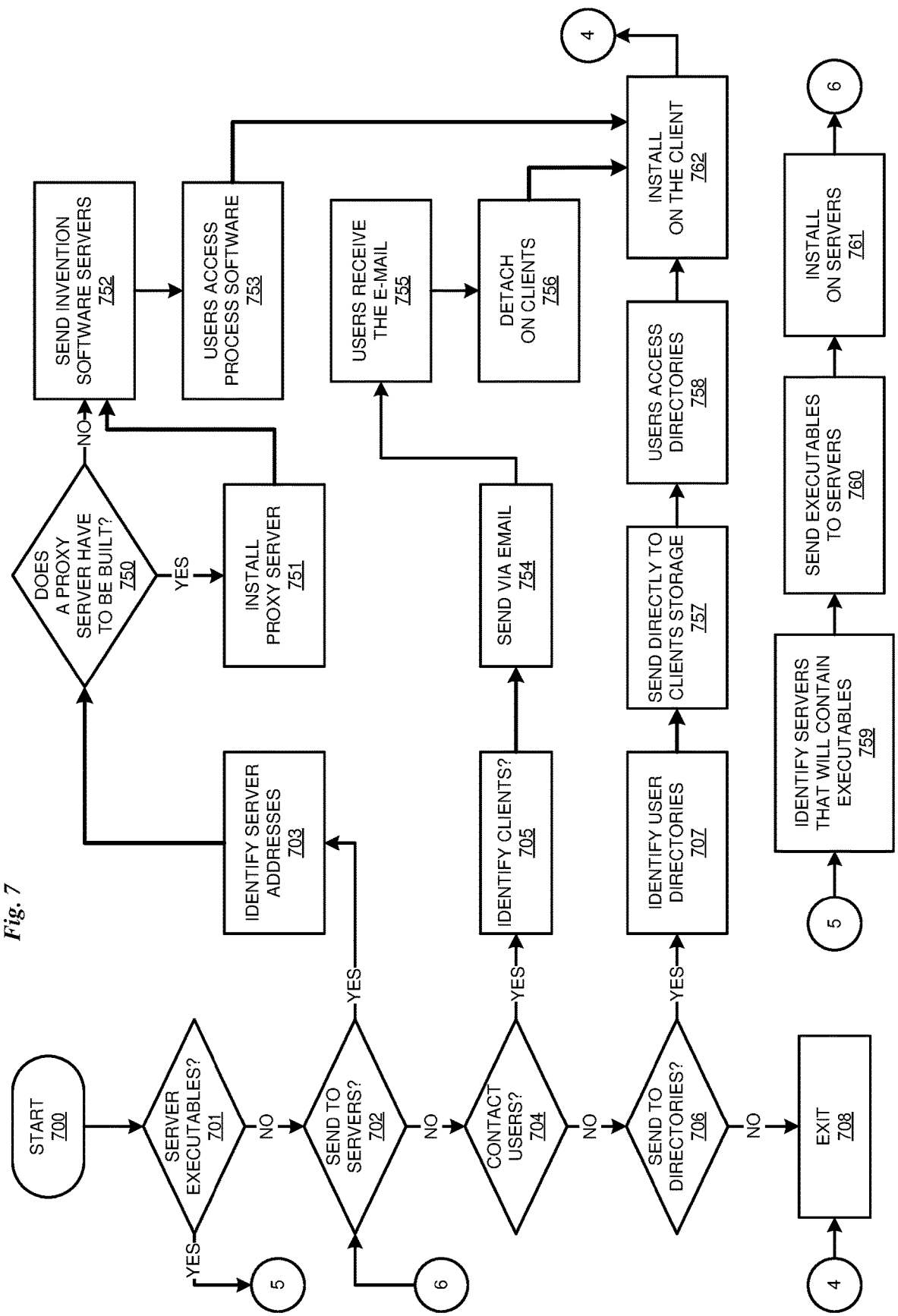
FIG. 7 depicts a flowchart diagram of an example Deployment process in accordance with an illustrative embodiment.

FIG. 7 depicts a flowchart diagram of an example Deployment process in accordance with an illustrative embodiment.
Introduction Loading the process software directly on the client, server, and proxy computers by loading a storage medium such as a CD, DVD, etc.

Automatically or semi-automatically deploying the process software into a computer system by sending it to a central server or a group of central servers. The process software is then downloaded into the client computers that will execute the process software.

Sending the process software directly to the client system via e-mail. The process software is then either detached to a directory or loaded into a directory by executing a set of program instructions that detaches the process software into a directory.

Sending the process software directly to a directory on the client computer hard drive.

When there are proxy servers, the process will select the proxy server code, determine on which computers to place the proxy servers' code, transmit the proxy server code, and then install the proxy server code on the proxy computer. The process software will be transmitted to the proxy server and then it will be stored on the proxy server.

While it is understood that the process software Application Recovery Accelerator may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 700 begins the deployment of the process software. An initial step is to determine if there are any programs that will reside on a server or servers when the process software is executed (701). If this is the case, then the servers that will contain the executables are identified (759). The process software for the server or servers is transferred directly to the servers' storage via FTP or some other protocol or by copying though the use of a shared file system (760). The process software is then installed on the servers (761).

Next, a determination is made on whether the process software is to be deployed by having users access the process software on a server or servers (702). If the users are to access the process software on servers, then the server addresses that will store the process software are identified (703).

A determination is made if a proxy server is to be built (750) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (751). The process software is sent to the (one or more) servers either via a protocol such as FTP, or it is copied directly from the source files to the server files via file sharing (752). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (753). Another embodiment is to have the servers automatically copy the process software to each client and then run the installation program for the process software at each client computer. The user executes the program that installs the process software on his client computer (762) and then exits the process (708).

In step 704 a determination is made whether the process software is to be deployed by sending the process software to users via e-mail. The set of users where the process software will be deployed are identified together with the addresses of the user client computers (705). The process software is sent via e-mail to each of the users' client computers (754). The users then receive the e-mail (755) and then detach the process software from the e-mail to a directory on their client computers (756). The user executes the program that installs the process software on his client computer (762) and then exits the process (708).

Lastly, a determination is made on whether the process software will be sent directly to user directories on their client computers (706). If so, the user directories are identified (707). The process software is transferred directly to the user's client computer directory (757). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (758). The user executes the program that installs the process software on his client computer (762) and then exits the process (708).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    enhancing a Recovery System comprising a standby cache segmented with a plurality of time segments wherein a data object with an accessed count above a threshold is cached in a time segment of the plurality of time segments of the standby cache, the enhancing comprising:
    detecting, by a Recovery System, a cache metric wherein the cache metric comprises a probability of access to a data object for each of the plurality of time segments of a failover log, wherein the probability of access to the data object for each of the plurality of time segments is based on an access time of the data object contained in the failover log;
    responsive to receiving the cache metric, segmenting, using a processor, the standby cache into the time segment; and
    caching by the Recovery System into the time segment of the standby cache of the data object based on the cache metric until determined by the processor that the standby cache is at maximum capacity wherein the data object is cached in the standby cache of the Recovery System.

2. The computer-implemented method of claim 1, wherein the caching by the Recovery System comprises receiving the data object from a backup storage.

3. The computer-implemented method of claim 1, wherein the cache metric further comprises assigning the data object to a time segment in the plurality of time segments based on a threshold probability value and a highest cumulative probability value.

4. The computer-implemented method of claim 1, wherein each of the plurality of time segments is non-uniform and wherein a duration of each of the plurality of time segments is constant across a plurality of failover runs.

5. The computer-implemented method of claim 1, wherein computing the probability of access to the data object for each of the plurality of time segments comprises computing a cumulative probability of the access to the data object in a time segment and a previous time segment.

6. The computer-implemented method of claim 1, wherein the caching by the Recovery System of the data object comprises caching the data object assigned to a time segment in chronological order.

7. The computer-implemented method of claim 1, wherein the standby cache of the Recovery System comprises a virtual machine.

8. A computer program product comprising one or more non-transitory computer readable storage media, and program instructions collectively stored on the one or more non-transitory computer readable storage media, the program instructions executable by a processor to cause the processor to perform operations comprising:
    enhancing a Recovery System comprising a standby cache segmented with a plurality of time segments wherein a data object with an accessed count above a threshold is cached in a time segment of the plurality of time segments of the standby cache, the enhancing comprising:
    detecting, by a Recovery System, a cache metric wherein the cache metric comprises a probability of access to a data object for each of the plurality of time segments of a failover log, wherein the probability of access to the data object for each of the plurality of time segments is based on an access time of the data object contained in the failover log;
    responsive to receiving the cache metric, segmenting, using a processor, the standby cache into the time segment; and
    caching by the Recovery System into the time segment of the standby cache of the data object based on the cache metric until determined by the processor that the standby cache is at maximum capacity wherein the data object is cached in the standby cache of the Recovery System.

9. The computer program product of claim 8, wherein the caching by the Recovery System comprises receiving the data object from a backup storage.

10. The computer program product of claim 8, wherein the cache metric further comprises assigning the data object to a time segment in the plurality of time segments based on a threshold probability value and a highest cumulative probability value.

11. The computer program product of claim 8, wherein each of the plurality of time segments is non-uniform and wherein a duration of each of the plurality of time segments is constant across a plurality of failover runs.

12. The computer program product of claim 8, wherein computing the probability of access to the data object for each of the plurality of time segments comprises computing a cumulative probability of the access to the data object in a time segment and a previous time segment.

13. The computer program product of claim 8, wherein the caching by the Recovery System of the data object comprises caching the data object assigned to a time segment in chronological order.

14. The computer program product of claim 8, wherein the standby cache of the Recovery System comprises a virtual machine.

15. A computer system comprising a processor and one or more computer readable storage media, and program instructions collectively stored on the one or more computer readable storage media, the program instructions executable by the processor to cause the processor to perform operations comprising:
  enhancing a Recovery System comprising a standby cache segmented with a plurality of time segments wherein a data object with an accessed count above a threshold is cached in a time segment of the plurality of time segments of the standby cache, the enhancing comprising:
  detecting, by a Recovery System, a cache metric wherein the cache metric comprises a probability of access to a data object for each of the plurality of time segments of a failover log, wherein the probability of access to the data object for each of the plurality of time segments is based on an access time of the data object contained in the failover log;
  responsive to receiving the cache metric, segmenting, using a processor, the standby cache into the time segment; and
  caching by the Recovery System into the time segment of the standby cache of the data object based on the cache metric until determined by the processor that the standby cache is at maximum capacity wherein the data object is cached in the standby cache of the Recovery System.

16. The computer system of claim 15, wherein the caching by the Recovery System comprises receiving the data object from a backup storage.

17. The computer system of claim 15, wherein the cache metric further comprises assigning the data object to a time segment in the plurality of time segments based on a threshold probability value and a highest cumulative probability value.

18. The computer system of claim 15, wherein each of the plurality of time segments is non-uniform and wherein a duration of each of the plurality of time segments is constant across a plurality of failover runs.

19. The computer system of claim 15, wherein computing the probability of access to the data object for each of the plurality of time segments comprises computing a cumulative probability of the access to the data object in a time segment and a previous time segment.

20. The computer system of claim 15, wherein the caching by the Recovery System of the data object comprises caching the data object assigned to a time segment in chronological order.

* * * * *